Patented Apr. 1, 1952

2,591,470

UNITED STATES PATENT OFFICE 2,591,470

AZO DYESTUFFS

Max Schmid, Riehen, Jakob Danuser, Arlesheim, Hans Johner and Eduard Moser, Basel, and Jakob Wuergler, Neuewelt, near Basel, Switzerland, assignors to Ciba Limited, Basel, Switzerland, a Swiss firm No Drawing. Application October 21, 1948, Serial No. 55,832. In Switzerland November 4, 1947

4 Claims. (Cl. 260—176)

The present invention relates to azo-dyestuffs which are obtained from unsulfonated diazo-compounds and certain acylacetic acid arylides. It is concerned with the new dyestuffs regardless of whether they are produced in substance or on the fiber.

According to this invention valuable acylacetic acid arylides are made by reacting 2 molecular proportions of a reactive derivative of an acylacetic acid with 1 molecular proportion of a 2:5-dialkoxy-1:4-diaminobenzene.

In many cases there may be used with advantage as the reactive derivative of an acylacetic acid a relatively easily accessible ester of such acid, especially a low molecular alkyl ester, for example, the ethyl ester. The derivative of an acylacetic acid may contain as the acyl residue the residue, for example, of an aliphatic carboxylic acid of low molecular weight, such as acetic acid, or the residue of an aliphatic carboxylic acid of high molecular weight or of an araliphatic, heterocyclic or especially aromatic carboxylic acid. As examples there may be mentioned acetoacetic acid ethyl ester, benzoylacetic acid ethyl ester and also benzoylacetic acid ethyl esters substituted in the benzene nucleus, for example, the ortho- or para-chloro-derivative or the 2:4-dichloro- or para-nitro-derivative.

As 2:5-dialkoxy-1:4-diaminobenzenes there come into consideration more especially those of which both of the alkoxy groups contain an alkyl residue of low molecular weight, for example, having at most 6 and advantageously 1 to 4 carbon atoms, and which alkoxy groups may be the same or may differ from one another. As examples there may be mentioned 2:5-dimethoxy-, 2:5-diethoxy-, 2:5-di-(propyloxy)- or 2:5-di-(isopropyloxy)-1:4-diaminobenzene, and also 2-methoxy-5-ethoxy-, 2-methoxy-5-butyloxy-, 2-methoxy-5-isopropyloxy- or 2-ethoxy-5-butyloxy-1:4-diaminobenzene.

The reaction of the acylacetic acid derivative, especially an ester, with the diaminobenzene may be carried out in known manner, for example, by heating in an inert solvent such as benzene, toluene, xylene, mono-, di- or tri-chlorobenzene or the like, with or without the addition of a substance promoting dissolution or a substance having a catalytic or enolising action such as a dimethylamine, pyridine, an ethanolamine, a trace of a caustic alkali, alcohol, etc.

There are obtained by the process of this invention acylacetic acid arylides of the general formula

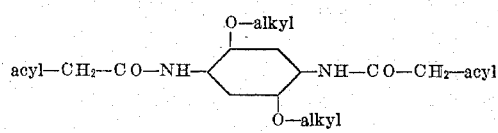

in which "acyl" represents the residue of a carboxylic acid. These arylides are valuable intermediate products, for example, for the manufacture of azo-dyestuffs. They are capable of coupling twice. Azo-dyestuffs made therefrom yield in many cases dyeings of valuable pure tints, especially in the range of green-yellow to orange-red, and of good fastness to light.

Those acylacetic acid arylides of which the acyl residues are derived from a carboxylic acid containing more than 3 carbon atoms, especially the benzoylacetic acid arylides, are in general distinguished by a favorable affinity towards vegetable fibers, and may be used with advantage for grounding vegetable fibers such as cotton or linen, and also artificial silk or staple fibers of regenerated cellulose.

According to a modification of the invention such acylacetic acid arylides containing acyl residues of high molecular weight are made by treating an acetoacetic acid arylide, obtained by the process of this invention from relatively easily accessible starting materials, with an acylating agent having more than 3 carbon atoms in accordance with the process of U. S. patent application Ser. No. 764,561 of July 29, 1947 (now U. S. Patent No. 2,538,168), and U. S. patent application Ser. No. 764,562 of July 29, 1947 (now abandoned), and then treating the acylation product so obtained with a hydrolyzing agent. As acylating agents having more than 3 carbon atoms there come into consideration, for example, reactive derivatives, especially the acid chlorides, of fatty acids of high molecular weight, but more especially the corresponding derivatives of benzoic acid or a substituted benzoic acid. As examples there may be mentioned the acid chlorides of benzoic acid, ortho- or para-chlorobenzoic acid, 2:4-dichlorobenzoic acid and para-nitrobenzoic acid. The acetoacetic acid arylide serving as starting material for the reaction is used in the form of its alkali metal compound, and is treated advantageously with only one half of an equivalent (1 molecular proportion) of the acylating agent, whereby one half of the starting material used is recovered. If desired, this residual starting material may be reconverted in the reaction mixture, after the reaction, by the addition of alkali hydroxide, into the alkali metal compound, and then treated with a corresponding quantity of the acylating agent.

By hydrolyzing the resulting acylation product of the probable formula

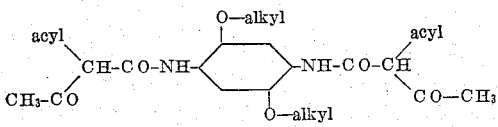

which may be carried out in a manner in itself known, by means of acid or alkali hydrolyzing agents, the acetyl residues are split off and the residue of higher molecular weight, especially a benzoyl residue, remains in the molecule.

There are obtained in accordance with this modification of the invention the same arylides as can be obtained directly by the use of acyl acetic acid esters containing the corresponding acyl residues of higher molecular weight.

Among these arylides those of the general formula

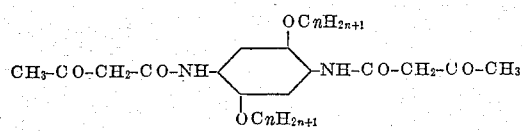

in which $n$ represents a whole number not exceeding two, are particularly valuable. By coupling them with unsulfonated diazo-compounds there are found new dyestuffs which are yellow to orange and brown pigments which, in substance or in the form of dyeings on the fiber, possess valuable properties, as follows from the further data in this application. As diazotizing components there may be used more especially those derived from amines of the naphthalene series and particularly of the benzene series. These latter dyestuffs thus correspond to the general formula

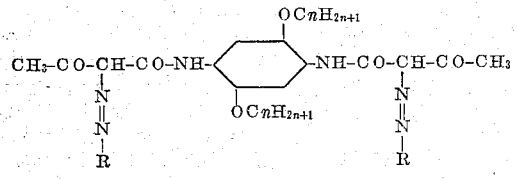

in which $n$ represents a whole number not exceeding two and R represents an aromatic radical containing at most 12 aromatically bound carbon atoms. As such diazo components there may be mentioned for example: para-toluidine, ortho- or meta-chloroaniline, ortho- or meta-nitraniline, 2:5-dichloraniline, 1-methoxy- or 1-methyl-2-amino-chlorobenzene, 1-methoxy-2-amino-5-nitrobenzene and 4-chloro-2-amino-1-diphenyl-ether.

The manufacture of the dyestuffs may be carried out in substance, whereby valuable pigments are obtained, and in many cases they can be produced on a substratum, for example on a textile fibre for which the derivative in question has an affinity.

For this purpose the various known methods may be used which find application in printing, for example, printing with mixtures which contain in addition to the arylide a stabilized diazo-compound, especially a diazo-amino-compound from a diazo-component and an amino-carboxylic acid or amino-sulfonic-acid.

The following examples illustrate the invention, the parts being by weight:

EXAMPLE 1

600 parts of xylene, 5 parts of triethanol-amine and 3 parts of alcohol are heated together at the boil in a vessel fitted with a stirring device and a condenser until the initially cloudy distillate becomes clear. There are then added 62.2 parts of ethyl-acetoacetate, and the whole is further distilled until the distillate has again become clear. There are then added in the course of about 1 hour 32.0 parts of 1:4-diamino-2:5-dimethoxybenzene. Alcohol is split off by the condensation. The condensation is carried on with the distillation of the alcohol formed until the reaction ceases, that is to say, for about 2-3 hours. The condensation product which crystallises upon cooling has the formula

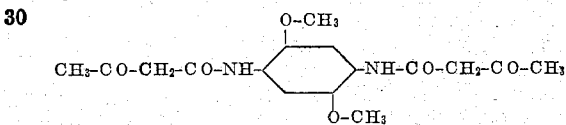

and is separated by filtering with suction, and then distilled for a short time with steam in order to remove contaminating xylol. The product thus freed from the condensation medium is separated by filtering after cooling, dissolved in dilute caustic soda solution, if desired with the addition of ethyl alcohol, filtered to remove any impurities and a precipitate is produced in the solution by the addition of an acid. The diarylide is a pale brown-grey powder which is soluble in dilute caustic alkalis and melts at 193-194° C. after recrystallisation from alcohol.

33.6 parts of the diarylide of the above formula are dissolved in 120 parts of water with the addition of 20 parts of sodium hydroxide solution of 36° Bé. 15 parts of benzoyl chloride are then added at 0-5° C. in the course of 30 minutes and the whole is stirred for 2-3 hours at 5° C. There are then added 20 parts of sodium hydroxide solution of 36° Bé. and in a similar manner 7.5 parts of benzoyl chloride, and this procedure is repeated two to three times with the use on each occasion of half the quantity of the products previously used. Finally a further 22 parts of caustic soda solution is added as described above, and the whole is stirred for a further 12 hours at about 5° C., and the solution is filtered to remove small quantities of insoluble matter. The diacyclated product has the probable formula

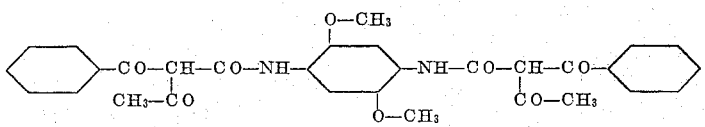

and can be separated by precipitation with hydrochloric acid. For the purpose of hydrolysis it is heated in alcohol with the addition of hydrochloric acid at 45-55° C., for about 24 hours.

Upon cooling the desired product having the probable formula

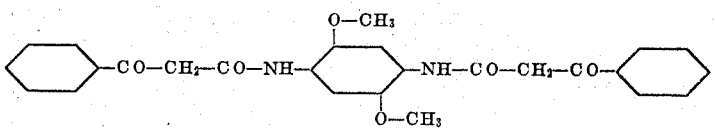

precipitates.

By using in the condensation described in the first paragraph of this example 1:4-diamino-2:5-diethoxybenzene, instead of 1:4-diamino-2:5-dimethoxy-benzene, there is obtained the diarylide of the formula

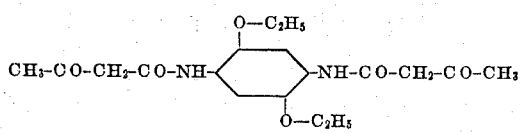

which has similar properties and melts at 207–208° C. after recrystallization from alcohol.

By replacing ethyl-acetoacetate by ethyl-benzoyl-acetate or a substitution product thereof such as ethyl chlorobenzoyl acetate or ethyl nitrobenzoyl acetate, the corresponding aroyl acetic acid diarylides are obtained.

EXAMPLE 2

33.6 parts of the condensation product from 1:4-diamino-2:5-dimethoxybenzene and 2 molecular proportions of ethyl acetoacetate are dissolved in dilute caustic soda solution. By the addition of acid while stirring the diarylide is precipitated in the form of a fine suspension. 28.3 parts of 1-amino-2-methyl-4-chlorobenzene are then diazotized in the usual manner and the diazo-solution is added dropwise to the aforesaid suspension, the coupling medium being maintained constantly neutral to Congo by the addition of sodium acetate. When the dyestuff formation has finished the whole is filtered with suction and the filter residue is thoroughly washed with water and dried at a low temperature. The product is a strongly colored brownish-orange powder yielding dyeings of very good fastness to light. The dyestuff so obtained corresponds to the formula

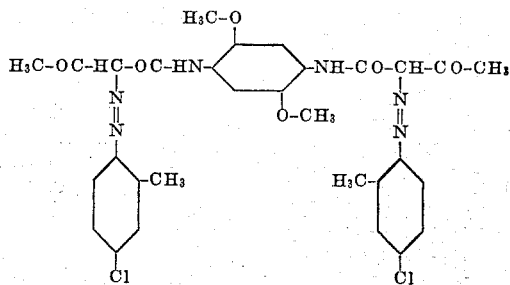

EXAMPLE 3

36.4 parts of the condensation product obtained from 1:4-diamino - 2:5 - diethoxybenzene and 2 molecular proportions of ethyl acetoacetate are intimately mixed with the antidiazotate of 1-amino-2-methyl-4-chlorobenzene prepared in the usual manner. The solid printing preparation is brought into the form ready for printing by the addition of caustic soda solution, a dispersing agent for example, Turkey red oil, and starch-tragacanth thickening. The preparation is printed on a web of fabric and the dyestuff is developed and fixed on the fiber by a method in itself known. A deep orange dyeing is obtained having good properties of fastness, and especially a very good fastness to light. The dyestuff so obtained corresponds to the formula

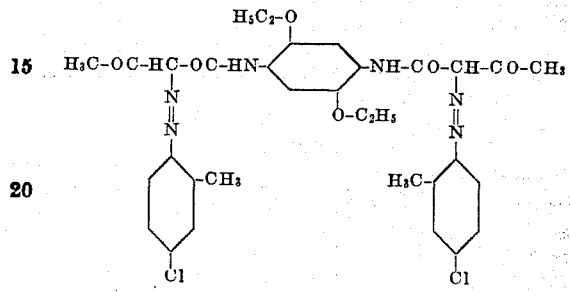

EXAMPLE 4

A printing paste consisting of 25 parts of diacetoacetyl-1:4-diamino-2:5 - dimethoxybenzene, 30 parts of the diazo amino-compound from diazotized 1-amino-4-methylbenzene and the sodium salt of methyl amino-acetic acid of the probable formula

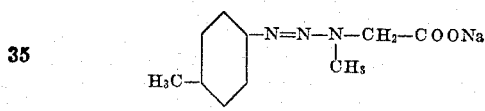

40 parts of Turkey red oil and 20 parts of alcohol, 30 parts of caustic soda solution of 30 per cent. strength, 255 parts of water and 600 parts of neutral starch tragacanth thickening is printed on a cotton fabric. The printed material is dried at 50–60° C. then steamed in a Mather Platt apparatus for 5 minutes at 100° C., in which apparatus the fabric is sprayed at the rate of 120 meters of web per hour with about 5 liters of a mixture of 1 part of acetic acid, 1 part of formic acid and 2 parts of water. The goods are rinsed cold, treated for 10 minutes at 40–50° C. with an enzyme preparation in order to remove the starch, rinsed cold, soaped at the boil for 10 minutes, rinsed hot and cold and then dried. There is obtained a clear gold-yellow dyeing. The printing paste has good stability. The dyestuff formed on the fiber according to this example corresponds to the formula

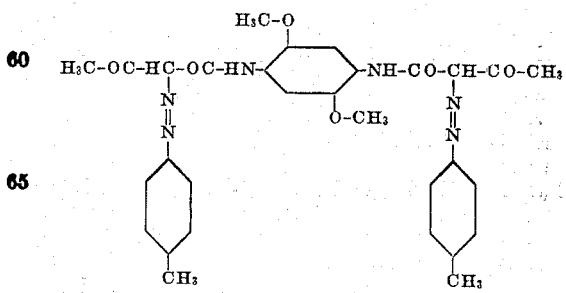

EXAMPLE 5

A printing paste consisting of 35 parts of diacetoacetyl - 1:4 - diamino - 2:5 - dimethoxybenzene, 80 parts of the diazonium compound from diazotized 1-amino-3-chlorobenzene and the disodium salt of 1-aminobenzene-2-carboxylic acid-5-sulfonic acid of the probable formula

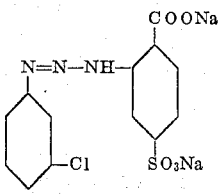

40 parts of Turkey red oil, 20 parts of alcohol, 30 parts of caustic soda solution of 30 per cent. strength, 205 parts of water, 600 parts of neutral starch tragacanth thickening, is printed on a cotton fabric, and developed, rinsed and soaped as described in Example 1. There is obtained a clear gold-orange dyeing. The printing paste keeps well even after long standing. The dyestuff formed on the fiber according to this example corresponds to the formula

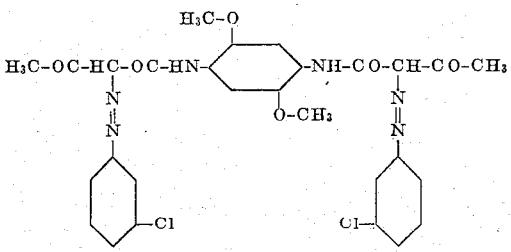

By using instead of the above mentioned diazo amino-compound, 75 parts of the diazo-amino-compound from diazotized 1-amino-3-chloro-6-methylbenzene of the disodium salt of 1-aminobenzene-2-carboxylic acid-5-sulfonic acid of the probable formula

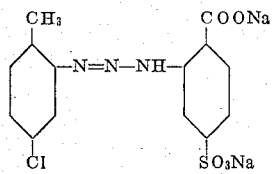

there is likewise obtained a gold-orange dyeing of very good fastness to light. The printing paste is of good stability.

EXAMPLE 6

A printing paste consisting of 35 parts of diacetoacetyl-1:4-diamino-2:5-dimethoxybenzene, 60 parts of the diazo-amino-compound from diazotized 1-amino-3-chloro-6-methoxybenzene and the sodium salt of methylamino-acetic acid of the probable formula

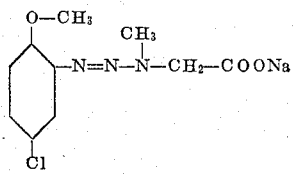

40 parts of Turkey red oil, 20 parts of alcohol, 30 parts of caustic soda solution of 30 per cent. strength, 215 parts of water, 600 parts of neutral starch tragacanth thickening is printed on the fiber and developed, rinsed and soaped as described in Example 1. There is obtained a strong gold-orange dyeing. The printing paste is of good stability.

EXAMPLE 7

A printing paste consisting of 35 parts of diacetoacetyl-1:4-diamino-2:5-dimethoxybenzene, 90 parts of the diazoamino-compound from diazotized 1-amino-4-nitro-6-methoxybenzene of the disodium salt of 1-methylaminobenzene-2-carboxylic acid-4-sulfonic acid of the probable formula

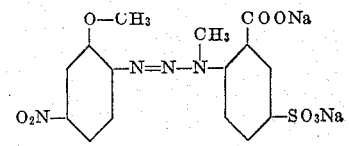

40 parts of Turkey red oil, 20 parts of alcohol, 30 parts of caustic soda solution of 30 per cent. strength, 185 parts of water, 600 parts of neutral starch tragacanth thickening is printed on the fabric and the fabric is developed, rinsed and soaped as described in Example 1. A powerful brown dyeing is obtained. The printing paste is of good stability.

EXAMPLE 8

100 parts of cotton yarn are treated at 30° C. for ½ hour in the grounding solution described below. The yarn is then thoroughly centrifuged and the grounded material is dyed for ½ hour in the developing solution of the composition given below. It is then well rinsed, soaped at the boil, and rinsed and dried.

*Grounding solution*

50 parts of diacetoacetyl-1:4-diamino-2:5-dimethoxybenzene, are dissolved at the boil in 60 parts of Turkey Red oil and 45 parts of caustic soda solution of 30 per cent. strength and 300 parts of water, the whole is made up to 1 liter with cold water and 45 parts of sodium chloride are added to the clear solution.

*Developing solution*

20 parts of 1-amino-3-chloro-6-methoxybenzene are pasted with 30 parts of hydrochloric acid of 30 per cent strength, 100 parts of water and 200 parts of ice. A solution of 8.9 parts of sodium nitrite in 50 parts of water is then poured in at 0–5° C. The clear diazo-solution is neutralized with sodium acetate to give a neutral reaction to Congo, mixed with 100 parts of acetic acid of 50 per cent. strength, and made up with ice water to 1 liter. A reddish-yellow dyeing of good fastness to light is obtained.

EXAMPLE 9

By using in Example 8 a developing solution which contains 30 parts of the diazonium chloride of 1-amino-2-methyl-4-chlorobenzene and 50 parts of glacial acetic acid in 1000 parts of water there is obtained a gold-orange dyeing of good fastness to light.

What we claim is:

1. An azo-dyestuff which corresponds to the formula

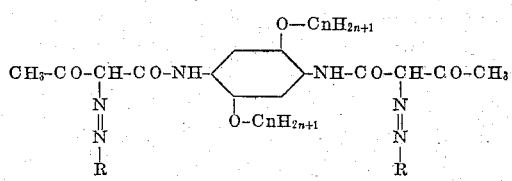

in which $n$ represents a whole number not exceeding two and R represents an aromatic radical of the benzene series, which radical is free from solubilizing groups.

2. An azo-dyestuff which corresponds to the formula

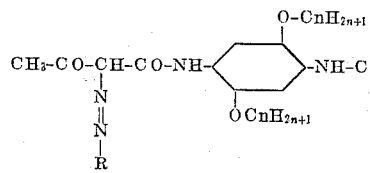

in which $n$ represents a whole number not exceeding two and R represents an aromatic radical of the benzene series, which radical is free from solubilizing groups and is substituted by at least one $CH_3$-group.

3. An azo-dyestuff which corresponds to the formula

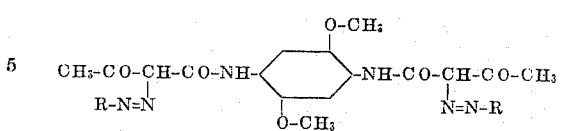

wherein R represents an aromatic radical of the benzene series, which radical is free from solubilizing groups and is substituted by at least one $CH_3$-group.

4. The azo-dyestuff of the formula

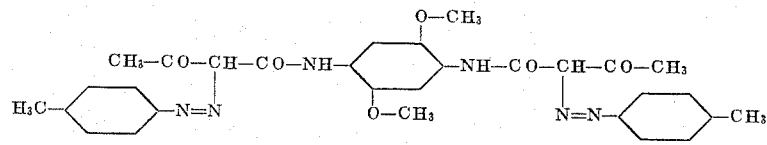

MAX SCHMID.
JAKOB DANUSER.
HANS JOHNER.
EDUARD MOSER.
JAKOB WUERGLER.

REFERENCES CITED

The following references are of record in the file of this patent:

UNITED STATES PATENTS

| Number | Name | Date |
|---|---|---|
| 1,505,568 | Laska et al. | Aug. 19, 1924 |
| 1,879,223 | Hardtmann | Sept. 27, 1932 |
| 2,023,615 | Reid | Dec. 10, 1935 |
| 2,310,181 | MacKenzie | Feb. 2, 1943 |

FOREIGN PATENTS

| Number | Country | Date |
|---|---|---|
| 550,805 | Great Britain | Jan. 26, 1943 |